United States Patent
Lo

(10) Patent No.: US 7,451,462 B2
(45) Date of Patent: Nov. 11, 2008

(54) DISK DRIVE HAVING A RESILIENT STRUCTURE FOR SEALINGLY CLOSING A TRAY OPENING

(75) Inventor: Wu-Jen Lo, Hinchu (TW)

(73) Assignee: Lite-On It Corporation, Taipei (TW)

( * ) Notice: Subject to any disclaimer, the term of this patent is extended or adjusted under 35 U.S.C. 154(b) by 383 days.

(21) Appl. No.: 11/336,998

(22) Filed: Jan. 23, 2006

(65) Prior Publication Data

US 2007/0016917 A1    Jan. 18, 2007

(30) Foreign Application Priority Data

Jul. 15, 2005  (TW) .............................. 94124046 A

(51) Int. Cl.
*G11B 33/14*  (2006.01)
*G11B 17/04*  (2006.01)
*G11B 17/056* (2006.01)

(52) U.S. Cl. .................................... 720/601

(58) Field of Classification Search ................. 720/646, 720/645, 601–616

See application file for complete search history.

(56) References Cited

U.S. PATENT DOCUMENTS

| 5,265,072 | A | * | 11/1993 | Numata et al. | ............... | 720/649 |
| 5,978,339 | A | * | 11/1999 | Sasaki et al. | ................ | 720/646 |
| 6,094,323 | A | * | 7/2000 | Tong | ........................ | 360/97.02 |
| 7,123,438 | B2 | * | 10/2006 | Seo | .......................... | 360/97.01 |
| 7,143,422 | B2 | * | 11/2006 | Bae | ............................. | 720/601 |
| 7,278,147 | B2 | * | 10/2007 | Pen | ............................ | 720/646 |

* cited by examiner

*Primary Examiner*—William J Klimowicz
(74) *Attorney, Agent, or Firm*—Ming Chow Sinorica, LLC

(57) ABSTRACT

A disk drive includes an outer casing having a front side formed with a tray opening, a tray disposed within the outer casing and movable with respect to the latter between retracted and extended positions and a tray cover attached to a front side of the tray. A resilient structure is interposed between the tray and the cover to provide a resilient force therebetween such that when the tray is retracted into the outer casing, the tray cover sealingly covers the tray opening in the front side of the outer casing by virtue of the resilient force provided by the resilient structure.

10 Claims, 4 Drawing Sheets

DISK DRIVE HAVING A RESILIENT STRUCTURE FOR SEALINGLY CLOSING A TRAY OPENING

FIELD OF THE INVENTION

The present invention relates to a disk drive, more particularly to a disk drive having a resilient structure interposed between a tray and a tray cover in order to sealingly cover a tray opening of an outer casing.

BACKGROUND OF THE INVENTION

FIG. 1 shows a perspective view of a conventional disk drive, and includes an outer casing 2, disk-carrying tray 4, and a tray cover 8. The outer casing 2 has a front panel 6 formed with a tray opening 602. The disk-carrying tray 4 is mounted within the outer casing 2, and is movable with respect to the outer casing 2 between a retracted position, in which the tray 4 is retracted into the outer casing 2 to permit reading of a disk placed in the tray 4, and an extended position, in which the tray 4 is protruded outwardly from the outer casing 2 via the tray opening 602. The tray cover 8 is attached to a front end of the tray 4 so that the tray cover 8 covers the tray opening 602 in the outer casing 2 when the tray 4 is disposed at the retracted position so as to prevent dirt from getting into the outer casing 2 in addition to providing an aesthetic effect thereof.

Because lack of the inaccuracy and precision in the dimension of the components and some common error during assembly of the components for forming the outer casing 2, the tray cover 8 is unable to cover the tray opening 602 sealingly when the tray 4 is disposed at the retracted position. Dirt may get into the outer casing 2. Besides, even though the tray cover 8 is pressed against the tray opening 602, the tray 4 may not reach the fully retracted position, and a turntable disposed in the outer casing 2 fails to clamp the disc placed in the tray 4 even though the tray opening 602 is covered by the tray cover 8.

It is noted that in the prior art, a spring is disposed between the tray 4 and the tray cover 8 in such a manner to pull the tray cover 8 to press against the tray opening 602. Such arrangement results in extra component and additional cost of the conventional disk drive.

SUMMARY OF THE INVENTION

The main object of the manufacturer is to find a way to produce a disk drive having a unique structure for overcoming the aforesaid disadvantages encountered during use of the conventional disk drive.

According to the present invention, a disk drive is provided to include: an outer casing having a front side formed with a tray opening; a tray disposed within the outer casing and movable with respect to the latter between a retracted position, in which the tray is retracted into the outer casing, and an extended position, in which the tray is protruded outwardly from the outer casing via the tray opening; a resilient structure including a mounting part fixed to a middle section of the front side of the tray and left and right lateral plates extending from two opposite ends of the mounting part in a direction parallel to the front side of the tray and cooperating with the front side to define a gap between each of the left and right lateral plates and the front side, each of the left and right lateral plates having a distal end portion; and a tray cover attached to the resilient structure, and having left and right fastening members respectively fixed to the distal end portions in the left and right lateral plates, whereby, when the tray is disposed in the retracted position, the tray cover abuts sealingly against the periphery of the tray opening in the front side of the outer casing.

BRIEF DESCRIPTION OF THE DRAWINGS

Other features and advantages of this invention will become more apparent in the following detailed description of the preferred embodiment of this invention, with reference to the accompanying drawings, in which.

DETAILED DESCCRIPTION OF THE PREFERRED EMBODIMENT

Figure 1:
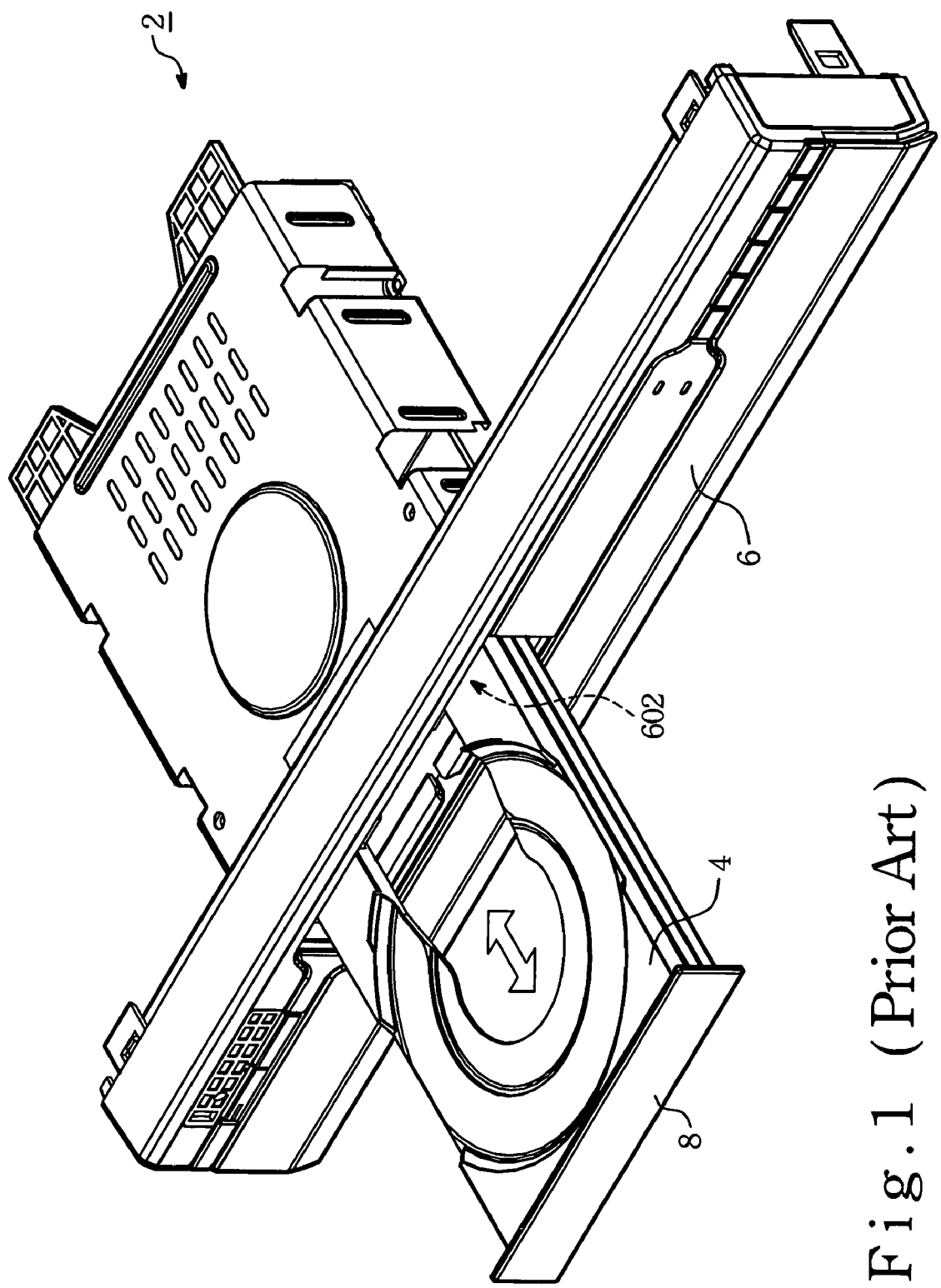
FIG. 1 is a perspective view of a conventional disk drive.
Figure 2:
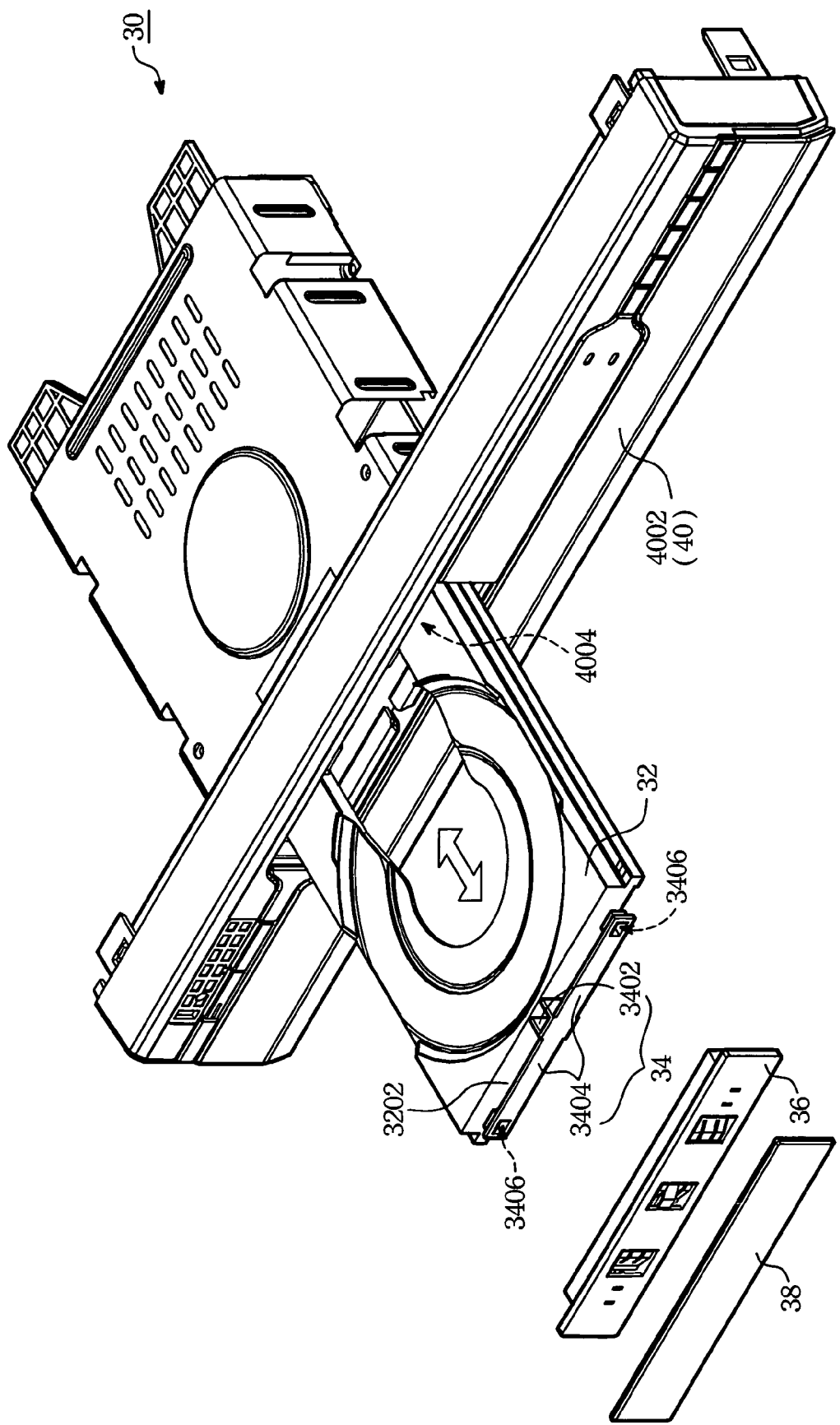
FIG. 2 is a partly exploded view of a disk drive of the present invention.

FIG. 2 is a partly exploded and perspective view of the disk drive of the present invention. The disk drive accordingly includes an outer casing 30, a disk-carrying tray 32, a resilient structure 34, a tray cover 36 and a decorative cover 38.

The outer casing 30 has a front side 4002 formed with a tray opening 4004. Some electronic components, such as a spindle motor for rotating the disk, a pick-up head for reading the disk during rotation, are disposed in the outer casing 30. The outer casing 30 has a front panel 40 defining the front side 4002. The tray opening 4004 is formed through the front panel 40.

The tray 32 is disposed within the outer casing 30, and is movable with respect to the latter between a retracted position, in which the tray 32 is retracted into the outer casing 30, and an extended position, in which the tray 32 is protruded outwardly from the outer casing 30 via the tray opening 4004.

The resilient structure 34 includes a mounting part 3402 and left and right lateral plates 3404. The mounting part 3402 is generally U-shaped, and is fixed to a middle section of the front side 3202 of the tray 32. The left and right lateral plates 3404 extend from two opposite ends of the mounting part 3402 in a direction parallel to the front side 3202 of the tray 32 and cooperate with the front side 3202 of the tray 32 to define a gap therebetween. Each of the left and right lateral plates 3404 has a distal end portion formed with a through hole 3406. In this embodiment, the resilient structure 34 is integrally formed with the tray 32 and the assembly thereof is produced by extrusion means.

The tray cover 36 is attached to the resilient structure 34, and has left and right fastening members 3602 respectively extending into and engaging the peripheries of the through holes 3406 in the left and right plates 3404 so as to prevent removal of the tray cover 36 from the resilient structure 3. Under this condition, when the tray 32 is disposed at the retracted position, the tray cover 36 abuts sealingly against the periphery of the tray opening 4004 in the front side 4002 of the outer casing 30.

The tray 32, the resilient structure 34 and the tray cover 36 can be made from POM (polyoxymethylene), Nylon or PC (polycarbonate) material.

The decorated cover 38 is attached to the tray cover 36 in order to conceal the tray cover 36 behind the decorated cover 38. The outer surface of the decorated cover 38 can be engraved or printed with picture in order to provide aesthetic effects to the disk drive of the present invention.

Figure 3:
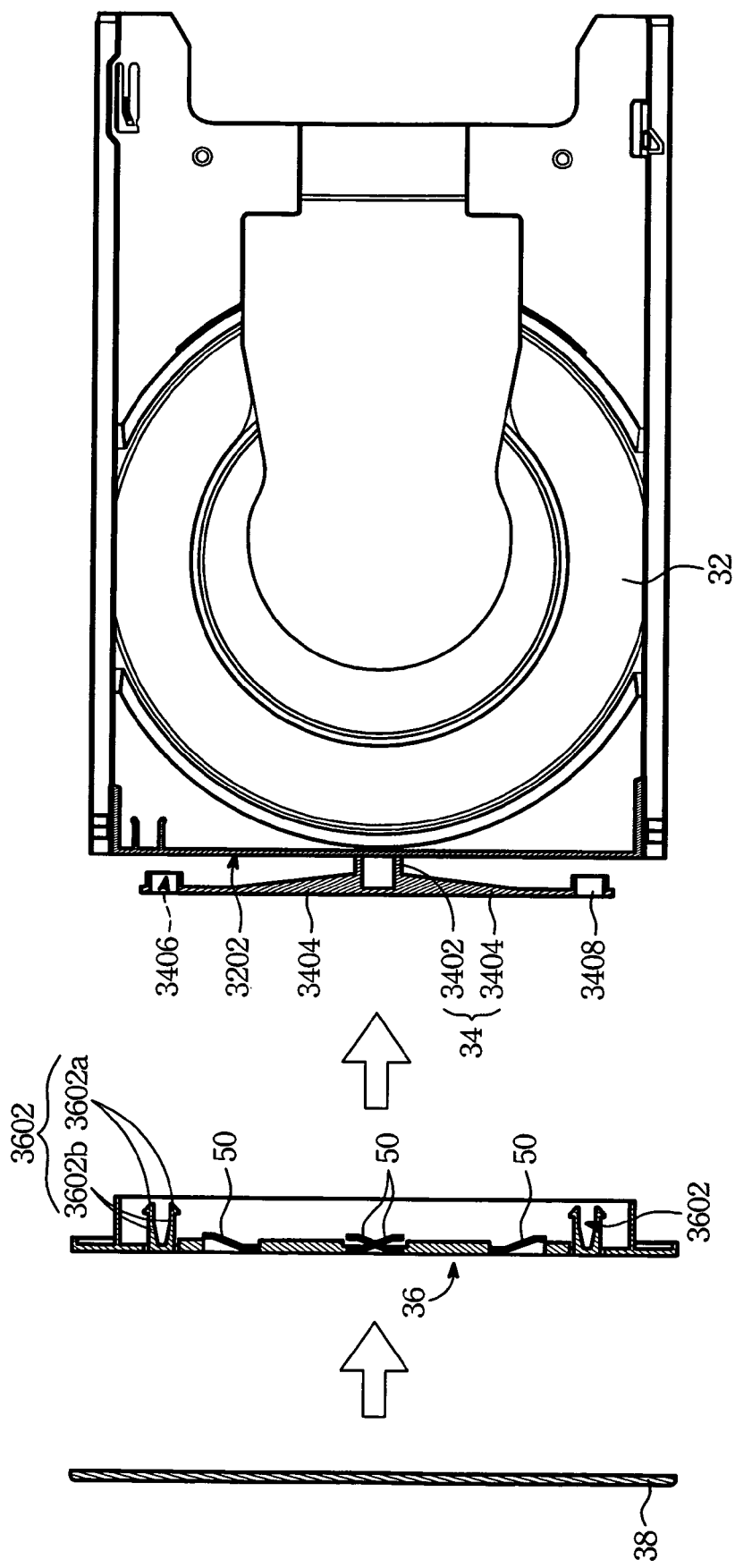
FIG. 3 is a top planar view illustrating how a tray cover is mounted on a resilient structure fixed on a disk tray of the disk drive of the present invention.

Referring to FIG. 3, the resilient structure 34 further includes left and right engaging tubes 3408 extending respectively into the gap from the peripheries of the through holes 3406 in the left and right lateral plates 3404. The tray cover 36 has a rear side wall facing the left and right lateral plates 3404. In this embodiment, each of the left and right fastening members 3602 includes two resilient parallel arms 3602b that extend from the rear side wall of the tray cover 36 and that are formed with barbed ends. 3602a hooking the engaging tubes 3408 of the left and right lateral plates 3404.

Figure 4:
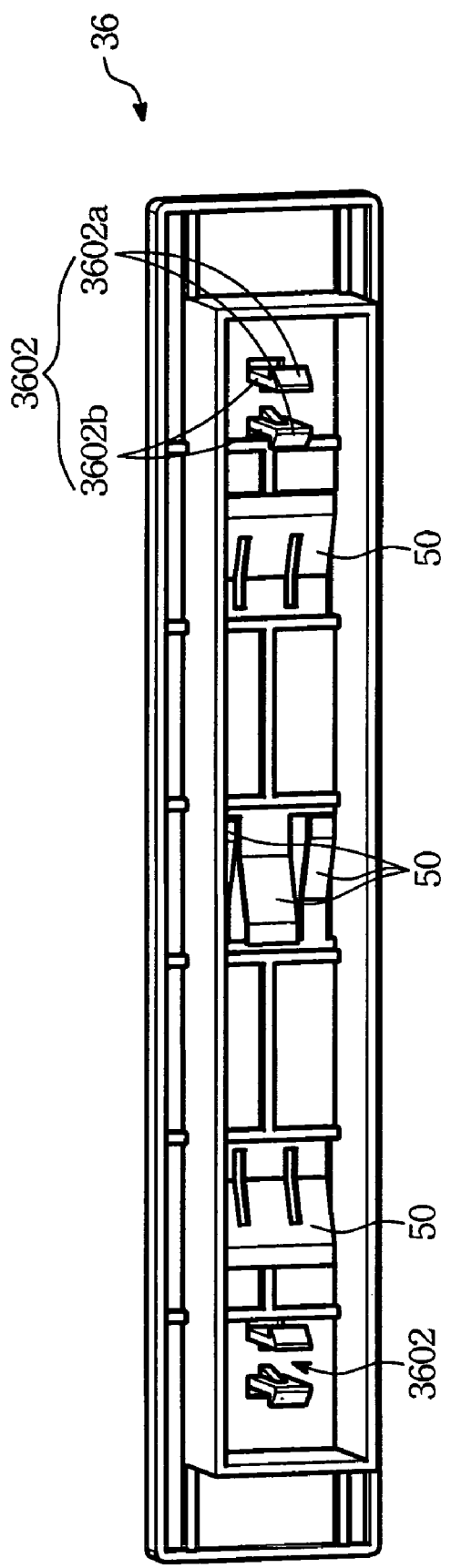
FIG. 4 is a rear side and perspective view of the tray cover of the disk drive of the present invention.

FIG. 4 shows a rear perspective view of the tray cover 36. The tray cover 36 further has left and right resilient biasing strips 50 that are disposed respectively adjacent to the left and right fastening members 3602 and that protrude outwardly from the rear side wall to press against the left and right lateral plates 3404 of the resilient structure 34 to result in a resilient force between the tray cover 36 and the resilient structure 34. The tray cover 36 further has two intermediate resilient biasing strips 50 that are disposed between the left and right resilient biasing strips 50 and that protrude outwardly from the rear side wall of the tray cover 36 in a criss-cross manner such that after assembly the intermediate biasing strips 50 press against the mounting part 3402 of the resilient structure 34 to enhance the resilient force between the tray cover 36 and the resilient structure 34.

Summarizing the abovementioned paragraphs, since the assembly of the resilient structure 34 and the tray cover 36 provides a resilient force therebetween, the tray cover 36 is able to abut against the resilient structure 34 so as to be fixedly attached on the front side of the tray 32.

According to the design of the resilient structure 34, the left and right lateral plates 3404 of the resilient structure 34 is slightly deformed to permit abutment of the tray cover 36 sealingly against the periphery of the tray opening 4004 in the outer casing 30 when the tray 32 is retracted into the outer casing 30. Therefore, dirt is prevented from entering into the outer casing 30, and the tray is able to arrive to the retracted position for the turntable to clamp the disk placed on the tray 32. The service life of the present disk drive is consequently prolonged.

While the present invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

I claim:

1. A disk drive comprising:
   an outer casing having a front side formed with a tray opening;
   a tray disposed within said outer casing and movable with respect to the latter between a retracted position, in which said tray is retracted into said outer casing, and an extended position, in which said tray is protruded outwardly from said outer casing via said tray opening;
   a resilient structure including a mounting part fixed to a middle section of a front side of said tray and left and right lateral plates extending from two opposite ends of said mounting part in a direction parallel to said front side and cooperating with said front side to define a gap between each of said left and right lateral plates and said front side, each of said left and right lateral plates having a distal end portion; and
   a tray cover attached to said resilient structure, and having left and right fastening members respectively fixed to said distal end portions of said left and right plates, whereby, when said tray is disposed in said retracted position, said tray cover abuts sealingly against the periphery of said tray opening in said front side of said outer casing.

2. The disk drive according to claim 1, wherein each of said distal end portions is formed with a through hole, said left and right fastening members respectively extending into and engaging peripheries confining said through holes.

3. The disk drive according to claim 2, wherein said resilient structure further includes left and right engaging tubes extending respectively into said gap from said peripheries of said through holes in said left and right lateral plates.

4. The disk drive according to claim 3, wherein said tray cover has a rear side wall facing said left and right lateral plates, each of said left and right fastening members including two resilient parallel arms that extend from said rear side wall of said tray cover and that are formed with barbed ends hooking said engaging tubes of said left and right lateral plates.

5. The disk drive according to claim 1, wherein said tray cover has a rear side wall facing said left and right lateral plates and left and right resilient biasing strips that are disposed respectively adjacent to said left and right fastening members and that protrude outwardly from said rear side wall to press against said left and right lateral plates of said resilient structure to result in a resilient force between said tray cover and said resilient structure.

6. The disk drive according to claim 1, wherein said tray cover has a rear side wall facing said resilient structure and two intermediate resilient biasing strips that are disposed on a middle section of said side wall of said tray cover and that protrude outwardly from said rear side wall to press against said mounting part of said resilient structure to enhance said resilient force between said tray cover and said resilient structure.

7. The disk drive according to claim 1, further comprising a decorated cover attached to said tray cover in order to conceal said tray cover behind said decorated cover.

8. The disk drive according to claim 1, wherein said outer casing has a front panel defining said front side, said tray opening being formed through said front panel.

9. The disk drive according to claim 1, wherein said resilient structure is integrally formed with said tray.

10. The disk drive according to claim 1, wherein said tray and said resilient structure are made from a material group consisting of POM (polyoxymethylene), Nylon and PC (polycarbonate).

* * * * *